(12) United States Patent
Stirling-Gallacher

(10) Patent No.: US 10,476,563 B2
(45) Date of Patent: Nov. 12, 2019

(54) SYSTEM AND METHOD FOR BEAM-FORMED CHANNEL STATE REFERENCE SIGNALS

(71) Applicant: Futurewei Technologies, Inc., Plano, TX (US)

(72) Inventor: Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 406 days.

(21) Appl. No.: 14/880,004

(22) Filed: Oct. 9, 2015

(65) Prior Publication Data

US 2016/0134352 A1 May 12, 2016

Related U.S. Application Data

(60) Provisional application No. 62/076,343, filed on Nov. 6, 2014.

(51) Int. Cl.
*H04B 7/0456* (2017.01)
*H04B 7/0426* (2017.01)
(Continued)

(52) U.S. Cl.
CPC .......... *H04B 7/0456* (2013.01); *H01Q 3/242* (2013.01); *H04B 7/043* (2013.01); *H04B 7/0639* (2013.01);
(Continued)

(58) Field of Classification Search
CPC .... H04W 16/28; H04W 72/046; H04B 7/043; H01Q 3/24; H01Q 3/242; H01Q 3/245
See application file for complete search history.

(56) References Cited

U.S. PATENT DOCUMENTS

2005/0226239 A1* 10/2005 Nishida ................. H04L 1/1874
370/389
2013/0051364 A1* 2/2013 Seol ..................... H04W 16/28
370/331
(Continued)

FOREIGN PATENT DOCUMENTS

| CN | 102958147 A | 3/2013 |
| CN | 103081371 A | 5/2013 |

(Continued)

OTHER PUBLICATIONS

"IEEE Standard for Information technolofy—Telecommunications and information exchange between systems; Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band," IEEE Computer Society; IEEE Std 802.11ad, Dec. 28, 2012, 626 pages.

*Primary Examiner* — Christopher M Crutchfield
(74) *Attorney, Agent, or Firm* — Slater Matsil, LLP

(57) ABSTRACT

A method for operating a reception point includes receiving a plurality of first directional reference signals spanning a first plane, selecting at least one first directional reference signal from the plurality of received first directional reference signals that meets a first selection criterion, sending a first feedback indicating the selected at least one first directional reference signal, receiving a plurality of second directional reference signals spanning a second plane oriented in accordance with the selected at least one first directional reference signal, selecting at least one second directional reference signal from the plurality of received second directional reference signals that meet a second selection criterion, and sending a second feedback indicating the selected at least one second directional reference signals.

20 Claims, 12 Drawing Sheets

(51) Int. Cl.
  *H04B 7/06* (2006.01)
  *H04W 72/04* (2009.01)
  *H04W 16/28* (2009.01)
  *H01Q 3/24* (2006.01)

(52) U.S. Cl.
  CPC .......... *H04B 7/0695* (2013.01); *H04W 16/28* (2013.01); *H04W 72/046* (2013.01)

(56) References Cited

U.S. PATENT DOCUMENTS

| | | | |
|---|---|---|---|
| 2013/0059619 A1* | 3/2013 | Kim | H04W 72/046 455/509 |
| 2013/0148600 A1 | 6/2013 | Moulsley et al. | |
| 2013/0242773 A1* | 9/2013 | Wernersson | H04B 7/024 370/252 |
| 2014/0055302 A1 | 2/2014 | Jia | |
| 2014/0146863 A1* | 5/2014 | Seol | H04B 7/0456 375/224 |
| 2014/0162717 A1 | 6/2014 | Liu | |
| 2014/0269441 A1* | 9/2014 | Hyde | H04W 4/24 370/259 |
| 2015/0341097 A1* | 11/2015 | Yang | H04B 7/0617 370/329 |
| 2017/0244462 A1* | 8/2017 | Wei | H04B 7/0626 |

FOREIGN PATENT DOCUMENTS

| | | |
|---|---|---|
| CN | 103716078 A | 4/2014 |
| CN | 103812619 A | 5/2014 |
| WO | 2010149038 A1 | 12/2010 |
| WO | 2013144365 A1 | 10/2013 |
| WO | 2013147565 A2 | 10/2013 |
| WO | 2013157785 A1 | 10/2013 |
| WO | 2014027824 A1 | 2/2014 |
| WO | 2014117352 A1 | 8/2014 |

* cited by examiner

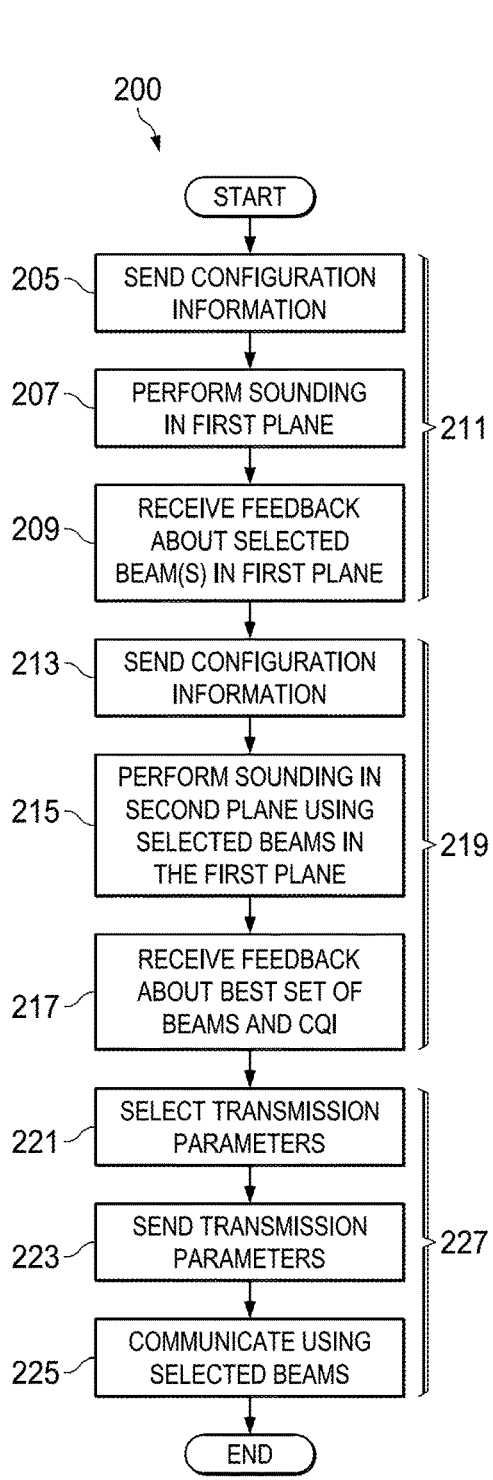
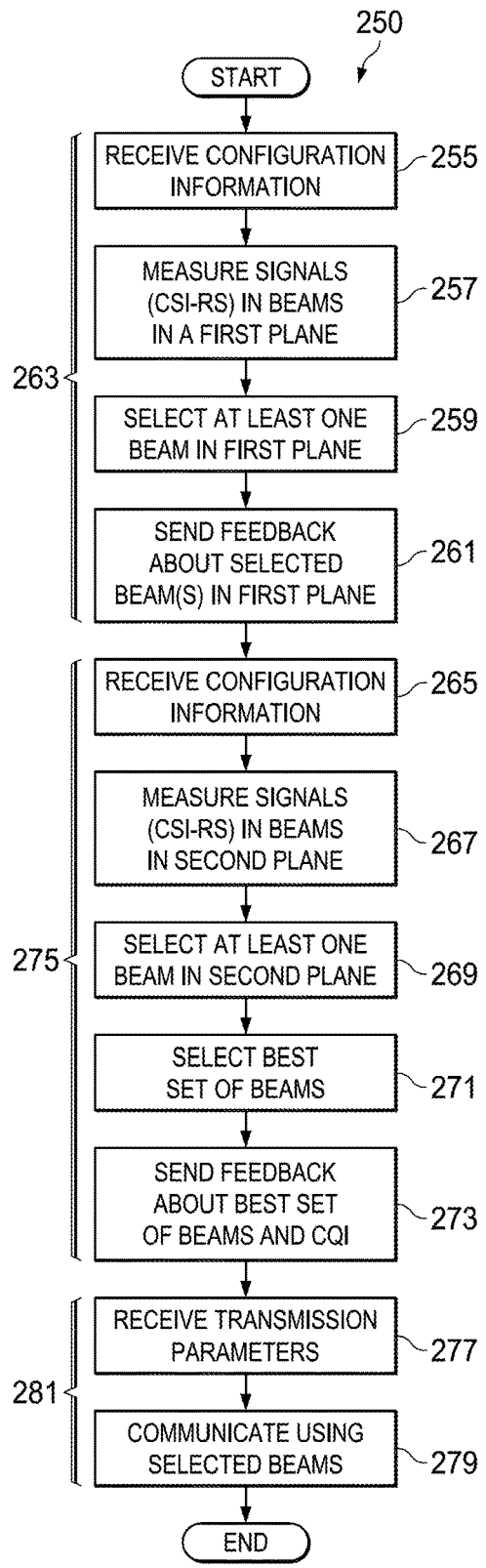
FIG. 2A
FIG. 2B

SYSTEM AND METHOD FOR BEAM-FORMED CHANNEL STATE REFERENCE SIGNALS

This application claims the benefit of U.S. Provisional Application No. 62/076,343, filed on Nov. 6, 2014, entitled "System and Method for Beam-Formed Channel State Reference Signals," which application is hereby incorporated herein by reference.

TECHNICAL FIELD

The present invention relates to digital communications, and, in particular embodiments, to a system and method for beam-formed channel state reference signals.

BACKGROUND

Many modern communications systems use channel state information reference signals (CSI-RS) transmitted by an Evolved NodeB (eNB) to assist User Equipment (UE) in measuring communications channels between the eNB and the UE. As an illustrative example, the eNB transmits a CSI-RS and a UE uses it to measure the communications channel and generate channel information, such as a channel quality indicator (CQI), precoding matrix index (PMI), rank indicator (RI), and the like, which it feedbacks to the eNB. eNBs may also commonly be referred to as NodeBs, base stations, access points, base terminal stations or transmission points, and the like, while UE may also be commonly referred to as mobile stations, mobiles, terminals, users, subscribers, and the like.

Generally for Massive Multiple Input Multiple Output (massive MIMO) or 3D MIMO communications systems, there are large numbers of transmit antennas (or ports) at the eNB. Therefore, the eNB would have to transmit a large number of CSI-RS signals in order to facilitate channel information between each transmit antenna (or ports) and each receiver antenna at each UEs. The transmission of the large number of CSI-RS would significantly impact overall communications system performance by consuming a large amount of network resources as overhead.

SUMMARY

Example embodiments provide a system and method for beam-formed channel state reference signals.

In accordance with an example embodiment, a method for operating a reception point is provided. The method includes receiving, by the reception point, a plurality of first directional reference signals spanning a first plane, selecting, by the reception point, at least one first directional reference signal from the plurality of received first directional reference signals that meets a first selection criterion, sending, by the reception point, a first feedback indicating the selected at least one first directional reference signal, receiving, by the reception point, a plurality of second directional reference signals spanning a second plane oriented in accordance with the selected at least one first directional reference signal, selecting, by the reception point, at least one second directional reference signal from the plurality of received second directional reference signals that meet a second selection criterion, and sending, by the reception point, a second feedback indicating the selected at least one second directional reference signals.

In accordance with another example embodiment, a method for operating a reception point is provided. The method includes receiving, by the reception point, a plurality of first directional reference signals from a transmission point, the plurality of first directional reference signals spanning a first plane, selecting, by the reception point, at least one first directional reference signal from the plurality of received first directional reference signals that meets a first selection criterion, sending, by the reception point, a first feedback indicating the selected at least one first directional reference signal, receiving, by the reception point, a configuration message with an indicator of a number of beam-formed reference signals in a second plane indicating no support for beam-forming in the second plane, and sending, by the reception point, a second feedback indicating a channel quality indicator for a subset of the at least one first directional reference signal.

In accordance with another example embodiment, a method for operating a transmission point is provided. The method includes sending, by the transmission point, a plurality of first directional reference signals to a reception point, the plurality of first directional reference signals spanning a first plane, and receiving, by the transmission point, a first feedback indicating at least one first directional reference signal meeting a first selection criterion and a request to commence operations in a second plane. The method includes, when the transmission point is capable of operations in the second plane, sending, by the transmission point, a plurality of second directional reference signals to the reception point, the plurality of second directional reference signals spanning a second plane oriented in accordance with the at least one first directional reference signal meeting the first selection criterion, and receiving, by the transmission point, a second feedback indicating at least one second directional reference signal.

In accordance with another example embodiment, a reception point is provided. The reception point includes a processor, and a computer readable storage medium storing programming for execution by the processor. The programming including instructions to configure the reception point to receive a plurality of first directional reference signals spanning a first plane, select at least one first directional reference signal from the plurality of received first directional reference signals that meets a first selection criterion, send a first feedback indicating the selected at least one first directional reference signal, receive a plurality of second directional reference signals spanning a second plane oriented in accordance with the selected at least one first directional reference signal, select at least one second directional reference signal from the plurality of received second directional reference signals that meet a second selection criterion, and send a second feedback indicating the selected at least one second directional reference signals.

In accordance with another example embodiment, a transmission point is provided. The transmission point includes a processor, and a computer readable storage medium storing programming for execution by the processor. The programming including instructions to configure the transmission point to send a plurality of first directional reference signals to a reception point, the plurality of first directional reference signals spanning a first plane, receive a first feedback indicating at least one first directional reference signal meeting a first selection criterion and a request to commence operations in a second plane, and when the transmission point is capable of operations in the second plane, send a plurality of second directional reference signals to the reception point, the plurality of second directional reference signals spanning a second plane oriented in accordance with the at least one first directional reference signal meeting the first selection criterion, and receive a second feedback indicating at least one second directional reference signal.

Practice of the foregoing embodiments reduces communications overhead by simplifying the complexity of a configuration process for beamformed reference signals.

BRIEF DESCRIPTION OF THE DRAWINGS

For a more complete understanding of the present invention, and the advantages thereof, reference is now made to the following descriptions taken in conjunction with the accompanying drawing, in which:

FIG. 2A illustrates a flow diagram of example operations occurring in a transmission point setting up and communicating using beam-formed CSI-RS in accordance with example embodiments presented herein;

FIG. 2B illustrates a flow diagram of example operations occurring in a reception point participating in the setting up and communicating using beam-formed CSI-RS in accordance with example embodiments presented herein;

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Figure 1:
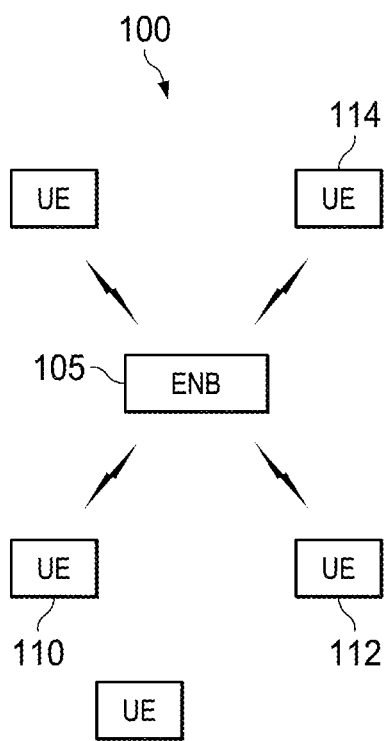
FIG. 1 illustrates example communications system; in accordance with example embodiments presented herein.

FIG. 1 illustrates an example communications system 100. Communications system 100 includes an eNB 105 serving a plurality of UEs, such as UEs 110, 112, and 114. In a first operating mode, transmissions for UEs as well as transmissions by UEs pass through eNB 105. eNB 105 allocates network resources for the transmissions to or from the UEs.

As discussed previously, the eNB transmits multiple CSI-RS to the UEs to enable the UEs to measure the communications channels between the different eNB transmission antennas (or ports) and the UEs' receiver antennas and to generate channel information, which is fedback to the eNB. The process of the eNB transmitting a CSI-RS is commonly referred to as sounding. When the eNB has a large number of transmitter antennas (or ports), such as in a massive MIMO implementation, sounding may consume a considerable amount of network resources, thereby negatively impacting communications system performance. A transmission point may be considered to be a device sending a transmission, and a reception point may be considered to be a device receiving the transmission. A single device may be both a transmission point and a reception point for different transmissions. As an illustrative example, a device may be a transmission point in a first transmission when it sends a transmission to another device, and the device may also be a reception point in a second transmission when it receives a transmission from yet another device. Examples of transmission and reception points may include base stations, NodeBs, eNBs, remote radio heads, access points, relays, UEs, mobiles, mobile station, terminals, users, subscribers, and so on.

According to an example embodiment, techniques for reduced sounding overhead of beam-formed CSI reference symbols (i.e., CSI and/or CSI-RS) for massive MIMO and/or 3D MIMO are provided. The techniques utilize different beam planes, such as azimuth and/or elevation. Since the different beam planes are consecutively sounded (as opposed to being individually sounded such as in prior art implementations of non-beam-formed CSI-RS) there is no ambiguity about the final rank. Furthermore, since the configuration of a second beam plane may be transmitted after feedback corresponding to a first beam plane has been received, the second plane beam-forming may adapt its sounding codebook, depending upon a chose feedback direction from the first beam plane (thereby accommodating non-linear 2D codebooks).

According to an example embodiment, the reduced sounding overhead is achieved by sounding in different directions in a first beam plane and then after feedback is received from reception points as to which of the first beam plane directions are suitable, the transmission point sounds in a second beam plane in the directions of the first beam plane indicated as being suitable. In such a configuration, all of the first beam plane (e.g., the azimuth) and the second beam plane (e.g., the elevation) directions do not have to be sounded exhaustively.

In order to maintain link budget for millimeter wave transmission, CSI-RS reference signals may have to use beam-forming at the transmission point and/or at the reception point. This is in contrast to CSI-RS signals used in 3GPP LTE-Advanced or future releases of LTE-Advanced using 3D MIMO in traditional cellular frequencies. If all CSI-RS 3D beam-forming directions for millimeter wave transmission are exhaustively sounded, the resulting overhead will be excessive, therefore, there is a need to design CSI-RS to minimize overhead. As an illustrative example, consider a 3D MIMO millimeter wave system with 12.5 deg HPBW azimuth beams at the transmission point and one 120 degree azimuth sector ($\Rightarrow$~12 azimuth beam directions needed) and 12.5 deg HPBW elevation beams at the transmission point with 30-40 degrees required elevation sweep (⇒~3-4 elevation beam directions needed) and 90 degree HPBW azimuth beams at the reception point with 360 degree required azimuth sweep (⇒~4 azimuth beam directions needed). Such a system will therefore need 144 CSI-RS symbols ((12×4)×3), which is very high overhead especially when compared to only 8 CSI-RS symbols presently used for Release-12 of LTE-Advanced standards compliant communications systems.

Beam-forming for millimeter wave systems may be implemented in many different ways, therefore, the CSI-RS design has to cover all cases. Some possible implementations of beam-forming for millimeter wave systems include:

RF beam-forming: RBF—all subcarriers for one symbol are subject to same steering vector;

Digital beam-forming: DBF—different subcarriers or resource blocks may have different steering vectors; and Hybrid beam-forming: HBF—RBF followed by DBF; DBF may steer beam inside RF beam; HBF may be implemented as fully connected or sub-array type architectures.

FIG. 2A illustrates a flow diagram of example operations 200 occurring in a transmission point setting up and communicating using beam-formed CSI-RS. Operations 200 may be indicative of operations occurring in a transmission point as the transmission point sets up and communicates using beam-formed CSI-RS. The example technique may be used with any kind of beam-forming: RBF, DBF, HBF, and the like. The example technique may be used with beam-forming in both the elevation (vertical) and azimuth (horizontal) directions. The example technique may be used for final transmission using codebook-based or non-codebook-based final transmission.

Operations 200 begin with the transmission point sending configuration information for a first plane (block 205). The configuration information may include CSI-RS configuration on a control channel, such as a BCCH. The CSI-RS configuration may be related to the CSI-RS on the first plane, such as the azimuth plane, for example. The CSI-RS may be sector and/or cell specific CSI-RS or reception point (i.e., UE) specific CSI-RS. The transmission point performs sounding in the first plane (block 207). Individual beam-formed reference signals are transmitted with different angles, orientations, and the like). The individual beam-formed reference signals lie in the first plane. In other words, the beam-formed reference signals form the first plane. The transmission point receives feedback information about selected beam(s) in the first plane (block 209). The feedback information includes information about one or more beams sounded by the transmission point that meets a selection criterion at a reception point. The feedback information may comprise indices of the one or more beams that meet the selection criterion. The feedback information may also indicate to the transmission point to begin beam-forming in a second plane, such as the elevation plane, for example. Collectively, blocks 205, 207, and 209 may be referred to as configuring, sounding and receiving feedback for beam-formed reference signals in the first plane (blocks 211).

The transmission point sends configuration information for the second plane (block 213). The configuration information may include CSI-RS configuration on a control channel, such as a BCCH. The CSI-RS configuration may be related to the CSI-RS on the second plane, such as the elevation plane, for example. The CSI-RS may be sector and/or cell specific CSI-RS or reception point (i.e., UE) specific CSI-RS. The transmission point performs sounding in the second plane using the one or more beams in the first plane that meet the selection criterion as fedback by the reception point (block 215). The use of the one or more beams in the first plane as indicated by the reception point helps to reduce the number of beam-formed CSI-RS sounded by the transmission point, thereby reducing the configuration time and complexity. Individual beam-formed reference signals are transmitted with different angles, orientations, and the like). The individual beam-formed reference signals lie in the second plane. In other words, the beam-formed reference signals form the second plane. The transmission point receives feedback information about a best set of beams (block 217). The feedback information includes information about a best set of beams out of the beams sounded by the transmission point in both planes. The feedback information includes information about one or more beams in the first plane that meets the first selection criterion and one or more beams in the second plane that meets a second selection criterion at the reception point. The feedback information may comprise indices of the one or more beams. The feedback information may also include channel quality indicators (CQI) for the one or more beams or for the overall channel. Collectively, blocks 213,215, and 217 may be referred to as configuring, sounding and receiving feedback for the best beam-formed reference signals (blocks 219).

The transmission point may select transmission parameters (block 221). The transmission parameters may include MCS level, beams selected in accordance to the received feedback, PMI, rank, and so on. The transmission point may send indications of the transmission parameters to the reception point (block 223). The transmission point communicates with the reception point using the transmission parameters (block 225). Collectively, blocks 221, 223, and 225 may be referred to as performing data communications (blocks 227).

FIG. 2B illustrates a flow diagram of example operations 250 occurring in a reception point participating in the setting up and communicating using beam-formed CSI-RS. Operations 250 may be indicative of operations occurring in a reception point as the reception point sets up and communicates using beam-formed CSI-RS. The example technique may be used with any kind of beam-forming: RBF, DBF, HBF, and the like. The example technique may be used with beam-forming in both the elevation (vertical) and azimuth (horizontal) directions. The example technique may be used for final transmission using codebook-based or non-codebook-based final transmission.

Operations 250 begin with the reception point receiving configuration information for a first plane (block 255). The configuration information may include CSI-RS configuration on a control channel, such as a BCCH. The CSI-RS configuration may be related to the CSI-RS on the first plane, such as the azimuth plane, for example. The CSI-RS may be sector and/or cell specific CSI-RS or reception point (i.e., UE) specific CSI-RS. The reception point measures signals sounded by the transmission point (block 257). The signals may be beam-formed CSI-RS. The reception point selects one or more beams in the first plane that meet a first selection criterion (block 259). Examples of the first selection criterion may include received signal strength, SNR, SINR, channel capacity, and the like. The reception point sends feedback about the one or more selected beams to the transmission point (block 261). The feedback may be in the form of indices of the one or more selected beams. Collectively, blocks 255, 257, 259, and 261 may be referred to as providing feedback about beam-formed CSI-RS in the first plane (block 263).

The reception point receives configuration information for a second plane (block 265). The configuration information may include CSI-RS configuration on a control channel, such as a BCCH. The CSI-RS configuration may be related to the CSI-RS on the second plane, such as the elevation plane, for example. The CSI-RS may be sector and/or cell specific CSI-RS or reception point specific CSI-RS. The reception point measures signals sounded by the transmission point (block 267). The signals may be beam-formed CSI-RS. The beam-formed CSI-RS of the second plane may be sounded only on the one or more selected beams in the first plane selected by the reception point and fedback to the transmission point. The reception point selects one or more beams in the second plane that meet a second selection criterion (block 269). Examples of the second selection criterion may include received signal strength, SNR, SINR, channel capacity, and the like. The reception point selects a best set of beams (block 271). The best set of beams includes beams in the first plane and the second plane that best meet the first selection criterion and the second criterion. The reception point sends feedback about the set of best beams to the transmission point (block 273). The feedback may be in the form of indices of the set of best beams. The feedback information may also include CQI for the set of best beams or for the overall channel. Collectively, blocks 265, 267, 269, 271, and 273 may be referred to as providing feedback about best beam-formed CSI-RS (block 275).

The reception point receives indications of transmission parameters from the transmission point (block 277). The transmission parameters may include parameters, such as MCS level, beams selected in accordance with the feedback, PMI, rank, and so on. The reception point communicates with the transmission point using the transmission parameters (block 279). Collectively, blocks 279 and 279 may be referred to as performing data communications (blocks 281).

Figure 3A:
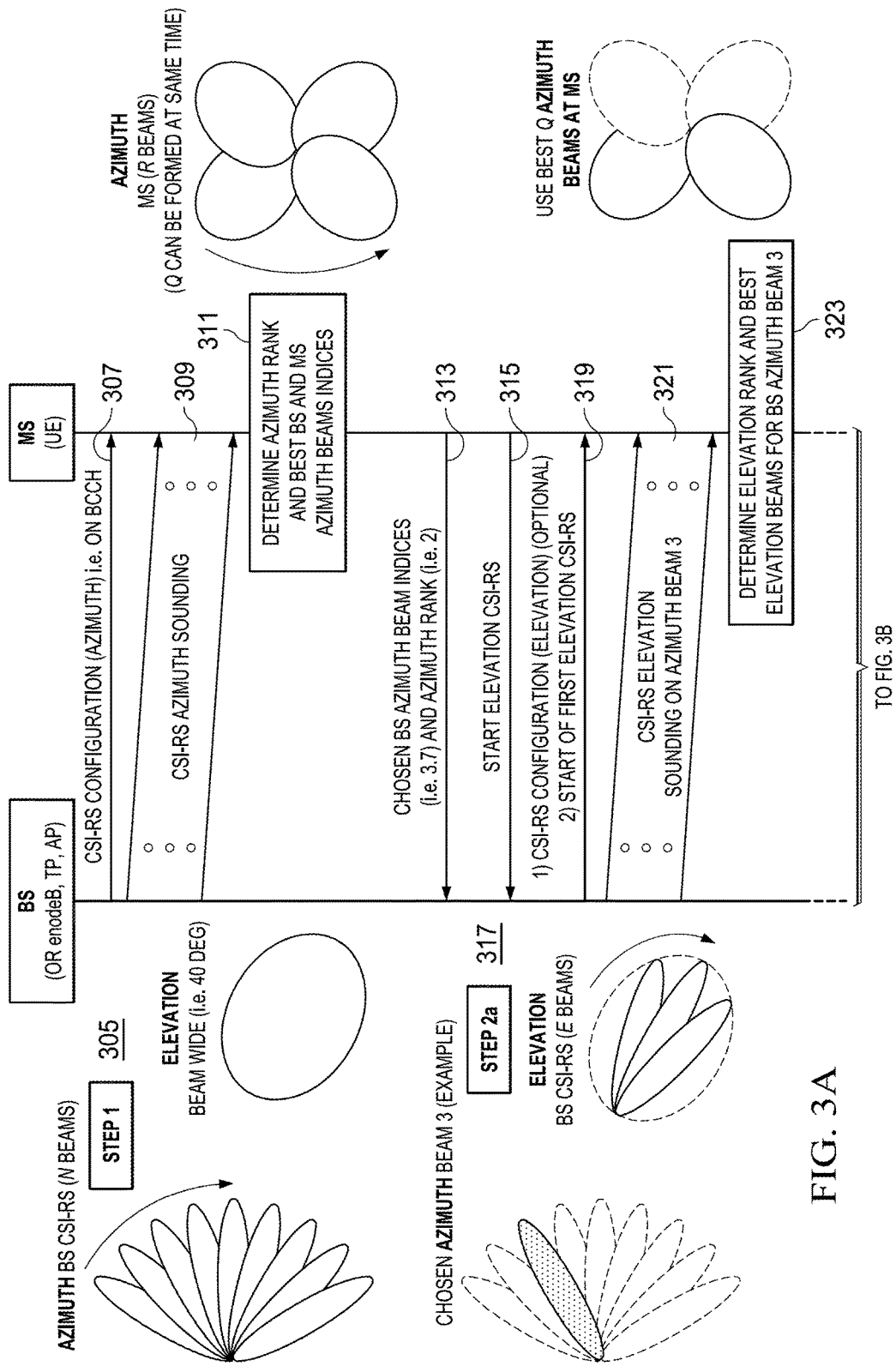
FIGS. 3A and 3B illustrate an example technique for using beam-formed CSI-RS in accordance with example embodiments presented herein.
Figure 3B:
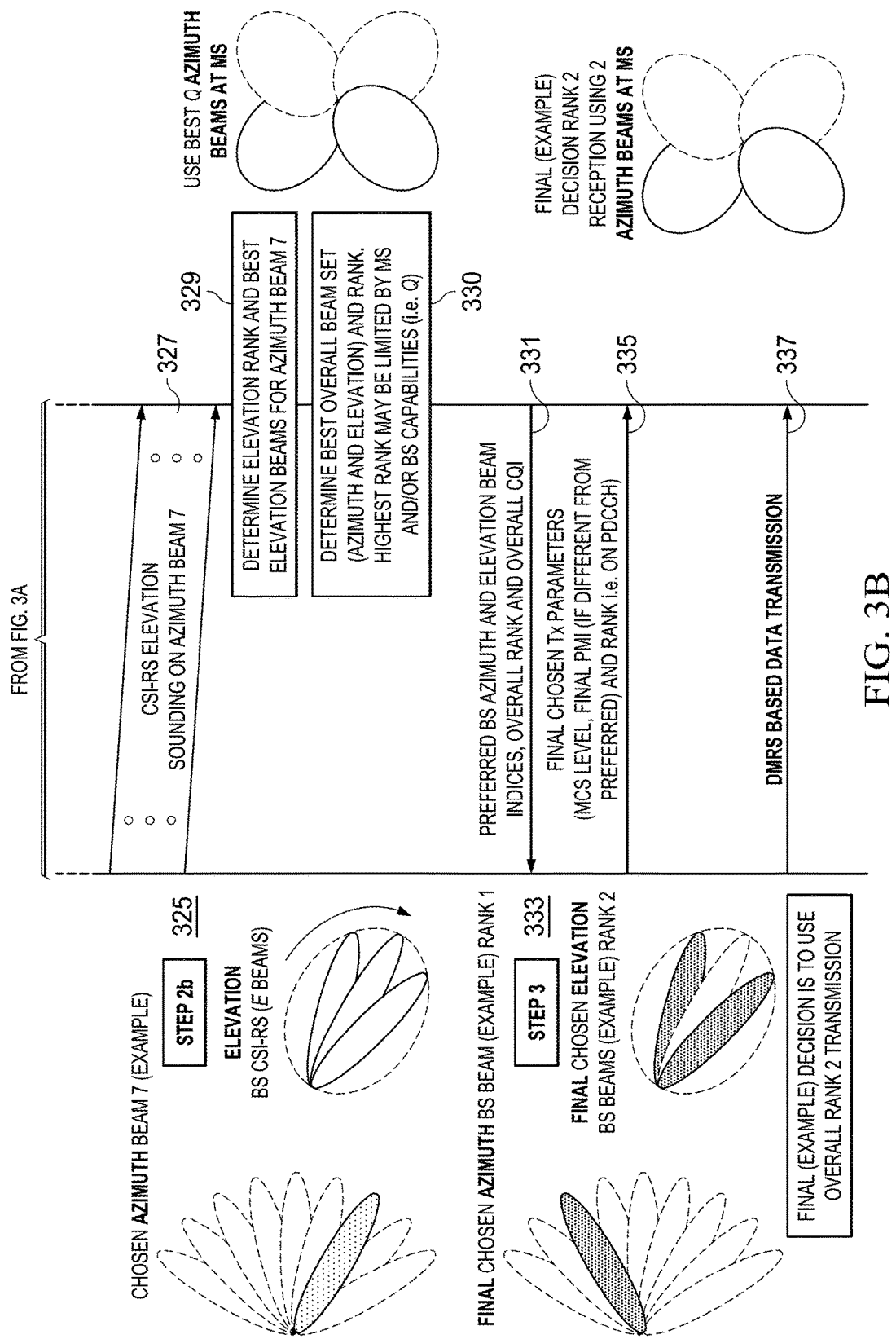

FIGS. 3A and 3B illustrate an example technique for using beam-formed CSI-RS. The example technique may be used with any kind of beam-forming: RBF, DBF, HBF, and the like. The example technique may be used with beam-forming in both the elevation (vertical) and azimuth (horizontal) directions. The example technique may be used for final transmission using codebook-based or non-codebook-based final transmission.

The example technique is a multi-step process. In a first step 305, beam-forming in the azimuth beam plane with wide beams in elevation is performed. As an illustrative example, a transmission point transmits CSI-RS configuration (event 307), as well as a plurality of beam-formed reference signals in a first plane (where the individual beam-formed reference signals are transmitted with different angles, orientations, and the like) (event 309). At a reception point, the plurality of beam-formed reference signals in the first plane are received and the reception point selects at least one of the beam-formed reference signals that meet a first selection criterion (event 311). Examples of the first selection criterion may include received signal strength, SNR, SINR, channel capacity, and the like. The reception point feeds back index(es) corresponding to the at least one selected beam-formed reference signals (event 313) and informs the transmission point to start beam-forming in the elevation beam plane (event 315). In second steps 317 and 325, beam-forming in the elevation beam plane using the best azimuth beam planes from the first step is performed. As an illustrative example, the transmission point transmits CSI-RS configuration for the elevation beam plane (optional, 319), as well as a plurality of beam-formed reference signals in a second plane where the beam-formed reference signals are beam-formed in the first plane in accordance with the feedback information provided by the receiving device (events 321 and 327). As an illustrative example, if the reception point feedback 1 index corresponding to one selected beam-formed reference signal in event 313, the transmission point will, in event 321, transmit a plurality of beam-formed reference signals spanning a second plane orient in accordance with the feedback index provided by the reception point. As another illustrative example, if the reception point feedback 2 indices corresponding to two selected beam-formed reference signals in event 313, the transmission point will, in events 321 and 327, transmit a plurality of beam-formed reference signals spanning a 1st second plane oriented in accordance with a first feedback index and a plurality of beam-formed reference signals spanning a 2nd second plane oriented in accordance with a second feedback index. The reception point selects at least one of the beam-formed reference signals that meet a second selection criterion (events 323 and 329). Examples of the second selection criterion may include received signal strength, SNR, SINR or channel capacity and the like. The reception point selects a best overall beam set for both the first plane and the second planes (block 330). Referring back to the illustrative examples presented above, in the scenario where the reception point selected two beam-formed reference signals in event 313, if the best overall beam set includes beams in a single second plane, the best overall beam set will include an index(es) that is a subset of the feedback provided in event 313. The reception point then feeds back index(es) and parameters (e.g., CQI and Rank) corresponding to the best overall beam-formed reference signal(s) in both the first plane and the second plane (event 331). In a third step 333, the transmission point selects transmission parameters, such as MCS level, beams selected in accordance with the feedback information PMI, rank, and so on, and transmits the transmission parameters to the reception point (event 335). The transmission point may perform demodulation reference symbols (DMRS) based data transmission (event 337). It may be possible to reverse the order (i.e., performing beam-forming in the elevation beam plane first, followed by beam-forming in the azimuth beam plane) in some situations, such as in high-rise building deployments.

Figure 4:
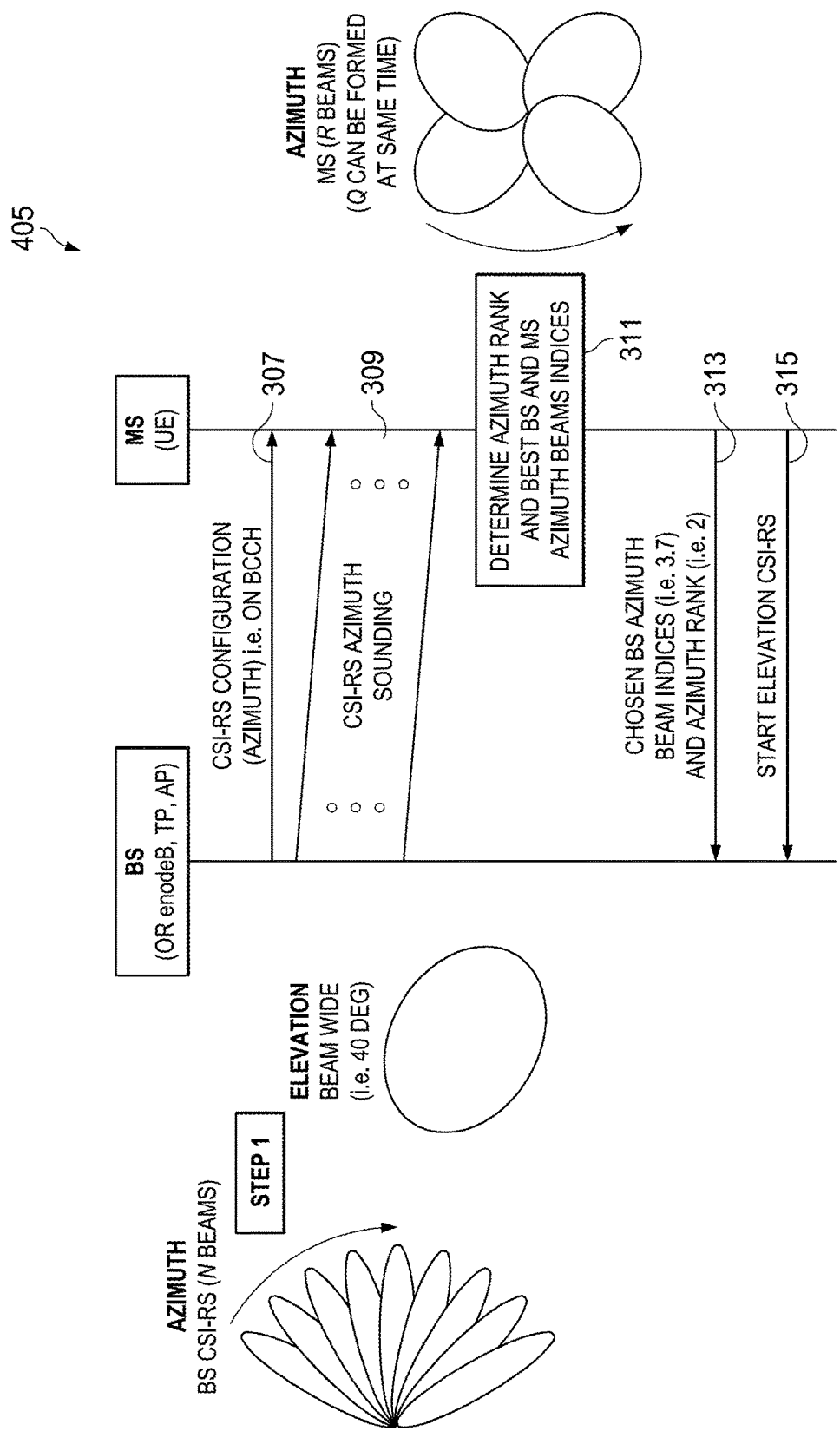
FIG. 4 illustrates a detailed view of an example first step of the technique for using beam-formed CSI-RS shown in FIGS. 3A and 3B in accordance with example embodiments presented herein.

FIG. 4 illustrates a detailed view of an example first step 405 of the technique for using beam-formed CSI-RS shown in FIGS. 3A and 3B. First step 405 may involve sector and/or cell specific CSI-RS (where every reception point receives the complete CSI-RS set) or reception point (i.e., UE) specific CSI-RS. If first step 405 involves reception point specific CSI-RS, the transmission point beam set may be reduced due to previous control and/or data communications between the transmission point and the reception point or due to initial call setup (i.e., by assuming best receiver beams at the transmission point to receive uplink RACH are the same as downlink CSI-RS). It is noted that such a scheme to reduce the beam set for reception point specific CSI-RS may only be appropriate for FDD operation.

If RF beam-forming (RBF) is used at the transmission point for first step 405, the N different CSI-RS beams may either be:

a) time division multiplexed (TDM) requiring N time slots or b) code division multiplexed (CDM) using a length N orthogonal spreading code (assuming that the transmission point has N RF chains).

If digital beam-forming (DBF) is used at the transmission point for the first step, the N different CSI-RS beams may additionally be frequency division multiplexed (FDM) on different subcarriers.

Depending on how many of the R beams (RF or digital) the reception point can form at the same time (Q), each CSI-RS beam in the first step may need to be repeated up to R times, so suitable reception point measurements may be made. The number of repetitions used by the transmission point may be signaled using azimuth CSI-RS configuration. The azimuth CSI-RS configuration information may include: the number of transmission point CSI-RS beams (N), the number of repetitions per CSI-RS beam, the reception point feedback method, the transmission point azimuth capability (i.e., maximum rank supported), TDM/FDM/CDM location of CSI-RS azimuth symbols, and the like. If CSI-RS is reception point specific and the reception point capability (i.e., Q) is known at the transmission point, the number of repetitions could be matched to the reception point. In the sector specific CSI-RS case, the number of repetitions may be fixed at a specified number to cover different reception point types.

Figure 5:
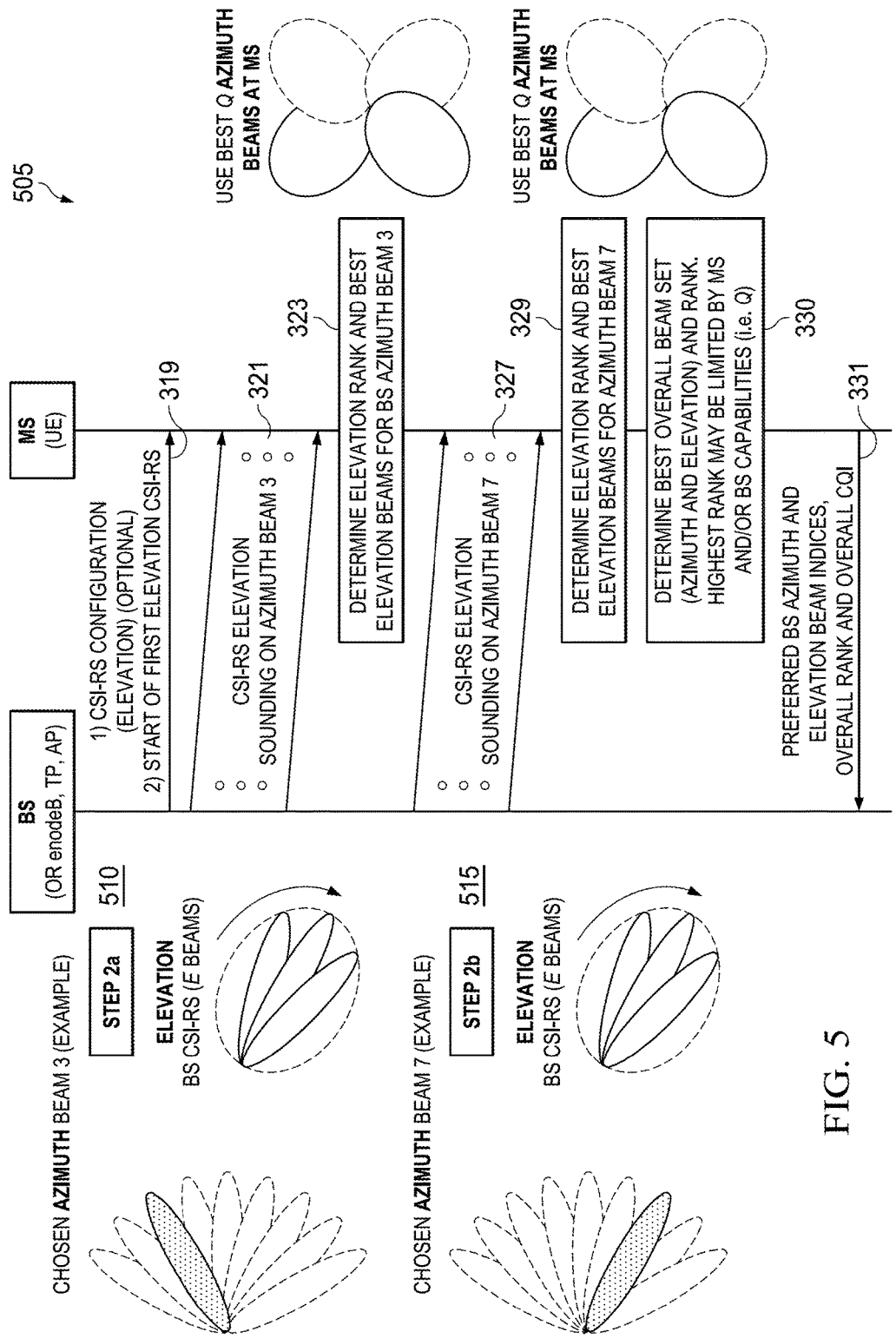
FIG. 5 illustrates a detailed view of an example second step of the technique for using beam-formed CSI-RS shown in FIGS. 3A and 3B in accordance with example embodiments presented herein.

FIG. 5 illustrates a detailed view of an example second step 505 of the technique for using beam-formed CSI-RS shown in FIGS. 3A and 3B. Second step 505 may include multiple substeps, such as substep 2a 510 and substep 2b 515, where the number of substeps is the same as the number of identified azimuth beam planes from a first step, such as first step 405. The number of substeps may range from 1 to a maximum azimuth rank supported by the transmission point. This maximum supported rank in azimuth and may be communicated to the reception point by CSI-RS configuration (for the azimuth plane).

The CSI-RS beams in elevation may be sounded in the identified azimuth beam planes fedback in the first step. This may be important since CSI at the reception point (as well as CQI reception point to transmission point feedback) is needed for the final azimuth/elevation combination.

When all of the CSI-RS sounding is complete, the reception point determines a best overall set of beams (azimuth and elevation), with a highest rank being limited by transmission point and/or reception point capabilities. The reception point feeds back beam indices, rank, CQI, and the like. The feedback may or may not be quantized. The CSI-RS elevation configuration information (see FIG. 5) may include: a number of identified azimuth beam planes, a number (E) of elevation CSI-RS beams per azimuth beam plane, a number of repetitions per CSI-RS beam, a reception point feedback method, a transmission point elevation capability (i.e., a maximum rank supported in elevation), TDM/FDM/CDM location of CSI-RS elevation symbols, and the like.

Figure 6:
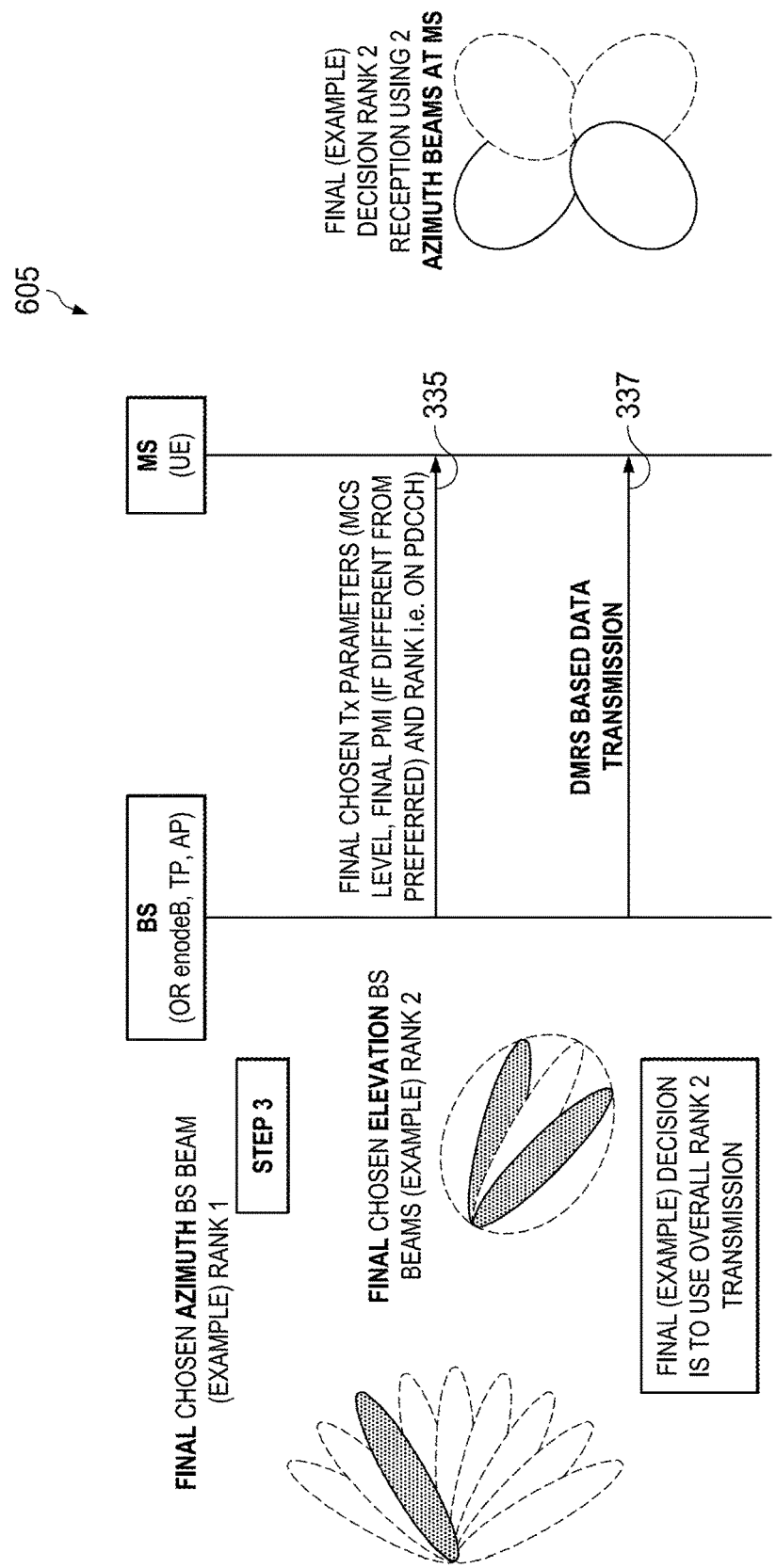
FIG. 6 illustrates a detailed view of an example third step of the technique for using beam-formed CSI-RS shown in FIGS. 3A and 3B in accordance with example embodiments presented herein.

FIG. 6 illustrates a detailed view of an example third step 605 of the technique for using beam-formed CSI-RS shown in FIGS. 3A and 3B. Third step 605 as shown in FIG. 6 corresponds to a codebook-based SU-MIMO transmission with transmission parameters, such as a final chosen precoding matrix indicator (PMI) (or beam indices), modulation and coding scheme (MCS) level, and rank indicator (RI) signaled to the reception point. The final chosen PMI (or beam indices) may be signaled to the reception point so that the reception point may adjust its receiver beams if a PMI is used at the transmission point is different from the one that it requested (the reception point's preferred PMI). Although the reception point has knowledge of the final PMI (or chosen beams), the reception point generally does not have channel estimation without beam-forming, hence the final transmission may need to use demodulation reference symbols (DMRS) for final transmission. Channel estimation for each layer is therefore performed using known code division multiplexing (CDM)/time division multiplexing (TDM)/frequency division multiplexing (FDM) sequence mapping for DMRS for each transmission layer.

Figure 7:
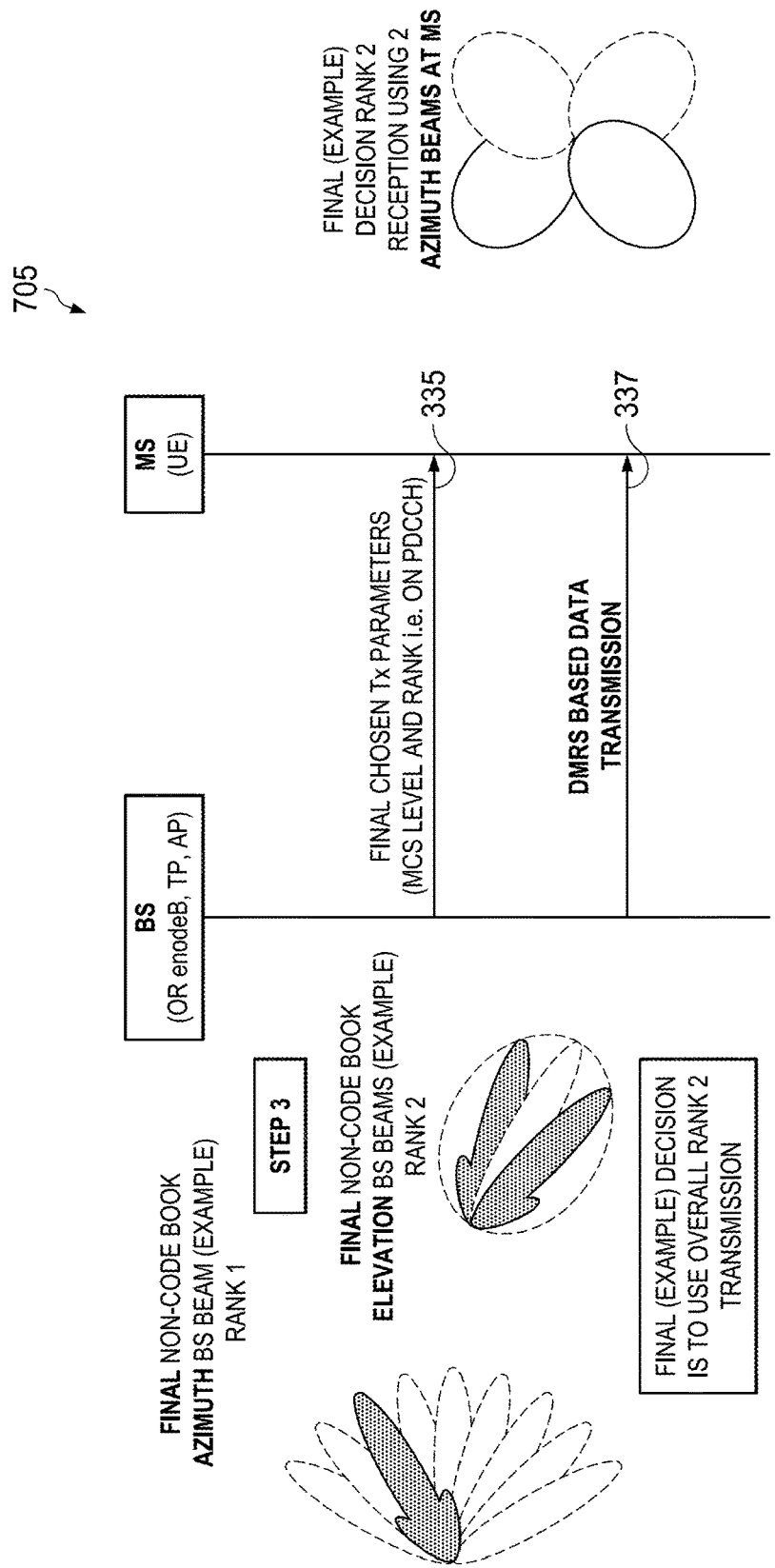
FIG. 7 illustrates a detailed view of another example third step of the technique for using beam-formed CSI-RS shown in FIGS. 3A and 3B in accordance with example embodiments presented herein.

FIG. 7 illustrates a detailed view of an alternative example third step 705 of the technique for using beam-formed CSI-RS shown in FIGS. 3A and 3B. Third step 705 as shown in FIG. 7 corresponds to a non-codebook-based transmission. Therefore, there is no signaling of the chosen PMI (or beams) since it is non-codebook-based. The reception point may initially assume that the best receiver beams are the same as the ones for the feedback PMI. For enhanced performance, the reception point may optionally search for alternative receiver beam combinations. Another possibility may be the reception point feeding back to the transmission point each transmit PMI and a best receive PMI. In the final transmission, the best receive PMI may be signaled to the reception point.

According to an example embodiment, CSI-RS elevation is performed prior to CSI-RS azimuth. Performing CSI-RS elevation beam-forming prior to CSI-RS azimuth beam-forming may be similar to the example technique described above where CSI-RS azimuth beam-forming is performed prior to CSI-RS elevation beam-forming with the ordering changed.

According to another example embodiment, reception point elevation beam-forming is performed with reception points with advanced capabilities. Reception point elevation beam-forming may be similar to reception point azimuth beam-forming. If the reception point is also capable of forming different beams in elevation, the reception point may indicate this capability (as well as the number of beams) to the transmission point using a start elevation CSI-RS message. The start elevation CSI-RS message is one of the messages passed at the end of the first step as shown in FIGS. 3A and 3B. The transmission point may then repeat transmission of the elevation CSI-RS beams to suit the advanced reception point capability.

According to another example embodiment, compatibility with simpler transmission points without elevation capability is provided. If a transmission point is not capable of elevation beam-forming or if it is temporarily unavailable (e.g., due to a fault in the transmission point or a temporary lack of hardware resources), this may be communicated to the reception point via the CSI-RS configuration elevation message and in particular by setting the number of the number (E) of elevation CSI-RS beams per azimuth beam plane to 1, (E=1) the reception point may then perform CQI feedback only on the azimuth CSI-RS beams. There may be several approaches to handle this particular scenario: a first approach may include the reception point feeding back CQI for preferred azimuth beams after receiving E=1, while a second approach may include the transmission point sounding again on preferred azimuth beams and the reception point feeding back CQI after receiving E=1. The techniques are discussed in further detail below.

Figure 8:
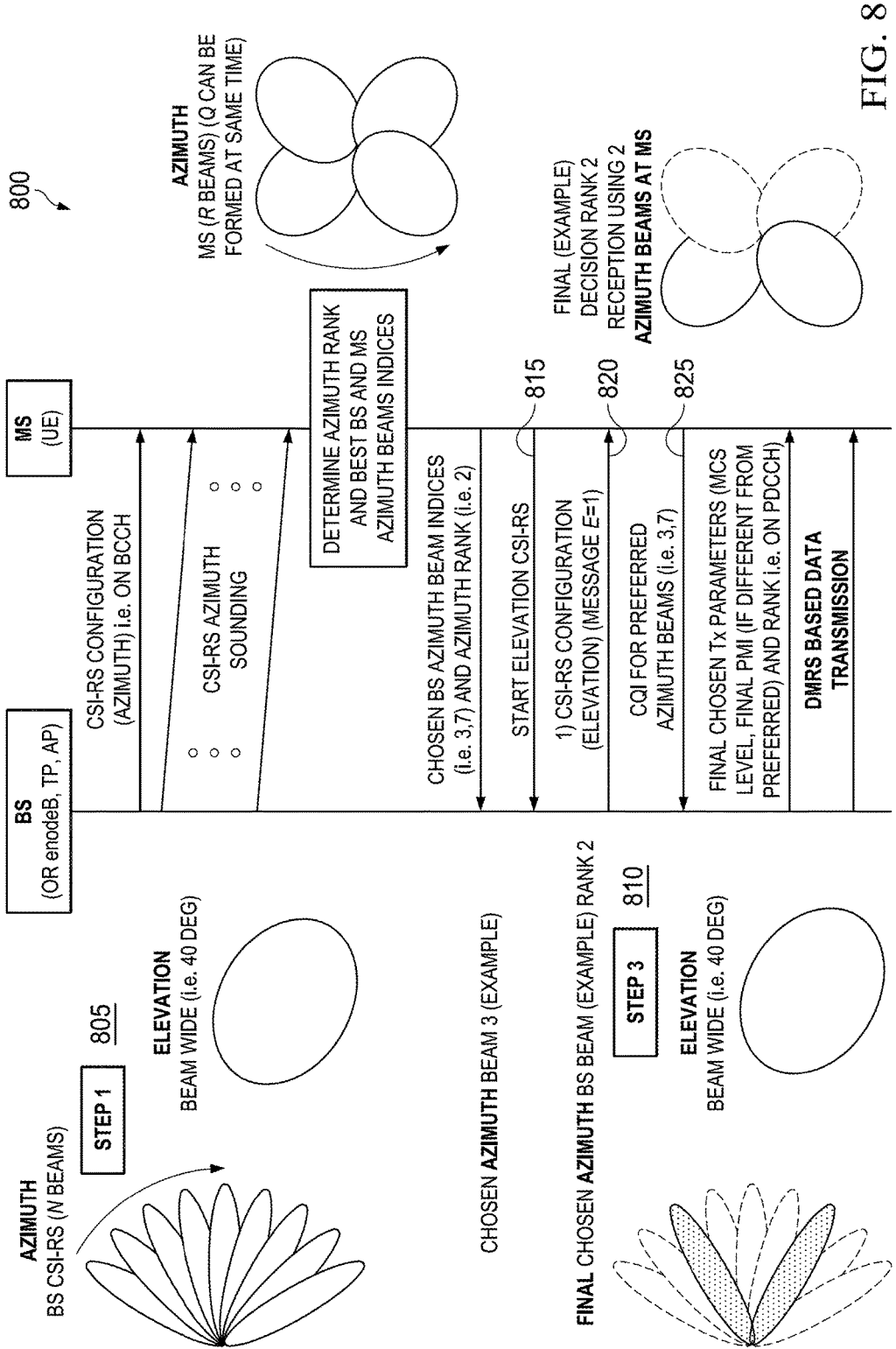
FIG. 8 illustrates a diagram of a first example approach to provide compatibility with simpler eNBs without beam-forming capability in two planes in accordance with example embodiments presented herein.

FIG. 8 illustrates a diagram of a first example approach 800 to provide compatibility with simpler transmission points without beam-forming capability in two planes. Without beam-forming capabilities in two planes, approach 800 is a simplified version of the technique for using beam-formed CSI-RS shown in FIGS. 3A and 3B. Approach 800 includes a first step 805 that is similar to first step 305 where beam-formed CSI-RS are sounded in a first plane and the reception point simply provides feedback for the one or more beams meeting a selection criterion for the first plane. When the reception point sends a message to the transmission point to start CSI-RS sounding in the second plane (event 815), the transmission point may respond with a second plane CSI-RS configuration message, containing the value of 1 (E=1) for the number of elevation CSI-RS beams per first plane beam to indicate that it is incapable of supporting beam-forming in two planes (event 820). The reception point may send feedback information for the best beam(s) in the first plane (event 825). The feedback information comprises CQI. Third step 810 is similar to third step 333 of FIG. 3B.

Figure 9A:
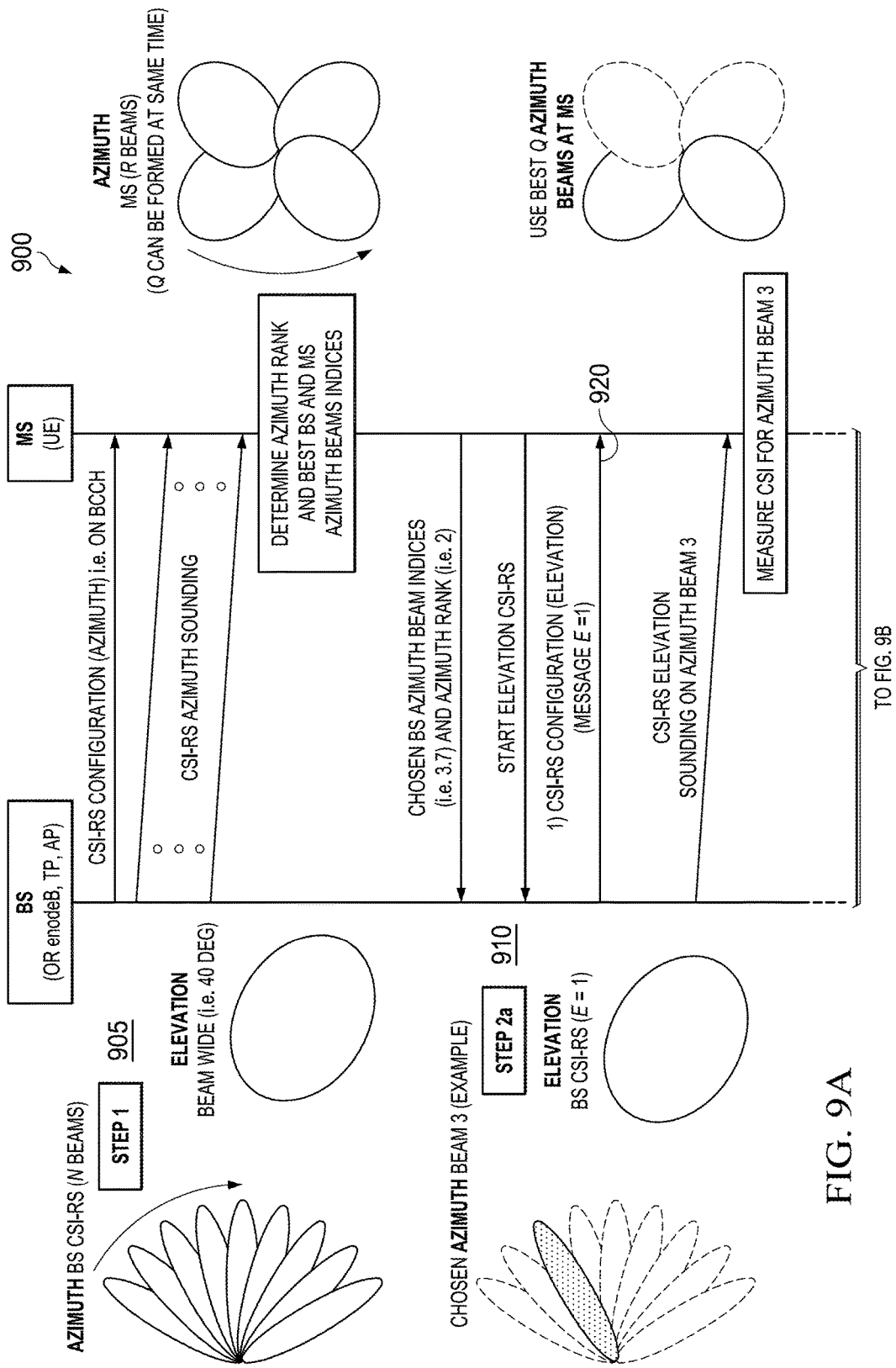
FIGS. 9A and 9B illustrate a diagram of a second example approach to provide compatibility with simpler eNBs without beam-forming capability in two planes in accordance with example embodiments presented herein.
Figure 9B:
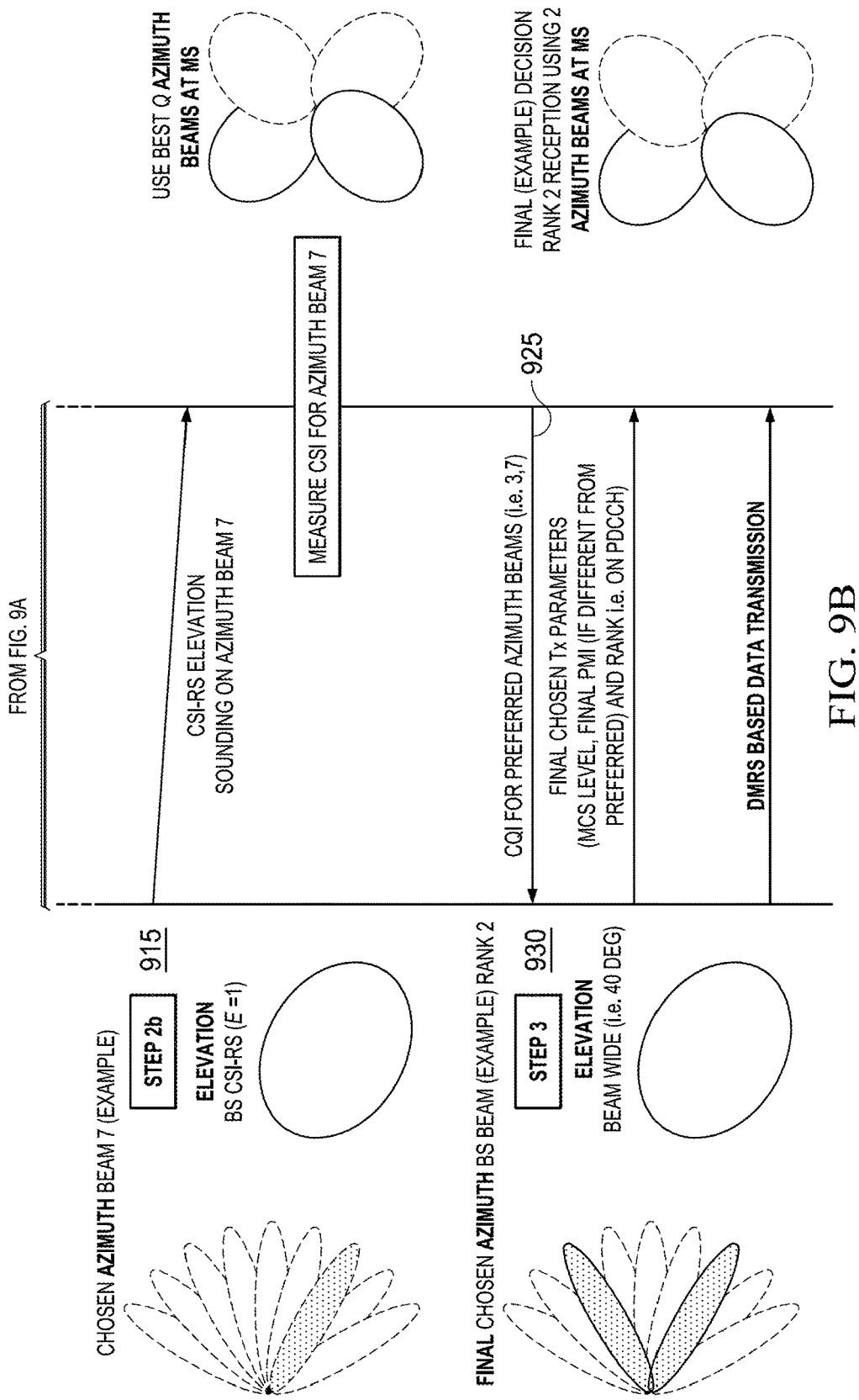

FIGS. 9A and 9B illustrate a diagram of a second example approach 900 to provide compatibility with simpler transmission points without two plane beam-forming capability. For this second approach the transmission point sounds again on the preferred first plane beams and the reception point feeds back the CQI. In a first step 905, the transmission point sounds beam-formed CSI-RS in a first plane and receives feedback from the reception point regarding beams that meet a selection criterion. In a second step, which may include multiple substeps, such as substep 910 and substep 915, the transmission point, after indicating to the reception point that it is incapable of supporting beam-forming in two planes (event 920), sounds again on first plane beams that meet the selection criterion (with each substep corresponding to each first plane beam that meets the selection criterion). As an illustrative example, in substep 910, the transmission point sounds in beam 3 and in substep 915, the transmission point sounds in beam 7, which were indicated by the reception point as beams in the first plane that met the selection criterion. The reception point measures channel state information for the first plane beams that meet the selection criterion. The reception point determines CQI from the channel state information. The reception point determines a best beam(s) and reports the best beam to the transmission point (event 925). A third step 930 is similar to third step 333 of FIG. 3B.

According to an example embodiment, multiple refinement levels of CSI-RS elevation and/or CSI-RS azimuth sounding are provided. CSI-RS elevation sounding may occur immediately following CSI-RS azimuth sounding, but the soundings may happen at different rates and/or refinement levels. As an illustrative example, in the situation of HBF, the CSI-RS azimuth sounding may occur in multiple refinement levels, with a first level involving CSI-RS with wider beams (e.g., cell specific CSI-RS) followed by narrower beam CSI-RS (e.g., user specific CSI-RS), before the elevation beams are sounded (CSI-RS elevation). The elevation CSI-RS sounding may also have multiple levels of refinement, e.g., wide beams about 20 degrees wide, followed by narrower beams. Multiple refinement levels may be useful for HBF. Elevation and azimuth sounding may be reversed.

According to an example embodiment, aperiodic or periodic CSI-RS sounding is performed as a second step. The first step of CSI-RS sounding (e.g., cell specific azimuth CSI-RS) may be periodic in nature. However, the second step of CSI-RS sounding may be aperiodic or periodic (e.g., initialized by the reception point using the start elevation CSI-RS signal). The start elevation CSI-RS signal may optionally come from the transmission point rather than the reception point. However, since CQI feedback (as well as subsequent final transmission with correct MCS) typically cannot start before elevation CSI-RS sounding has completed, the second step of CSI-RS sounding (e.g., elevation CSI-RS sounding) performed at a low rate may result in a performance loss.

According to an example embodiment, CSI-RS configuration signaling is specified. The basic concept has been discussed previously with separate signaling instances for first step configuration (i.e., CSI-RS azimuth configuration) and second step configuration (i.e., CSI-RS elevation configuration). The proposal of such an approach for second step configuration (e.g., elevation configuration) may be changed dramatically based on which first step beams (e.g., azimuth beams) are fed back. An example as to where this might be useful is for non-linear or irregular 2D beam-forming codebooks where the code book for the second step and resulting second plane code book could change depending upon the feedback in the first step. However, if the second step configuration is static or always the same, the configuration signaling for the first step and the configuration signaling for the second step may occur together at the same time.

Figure 10:
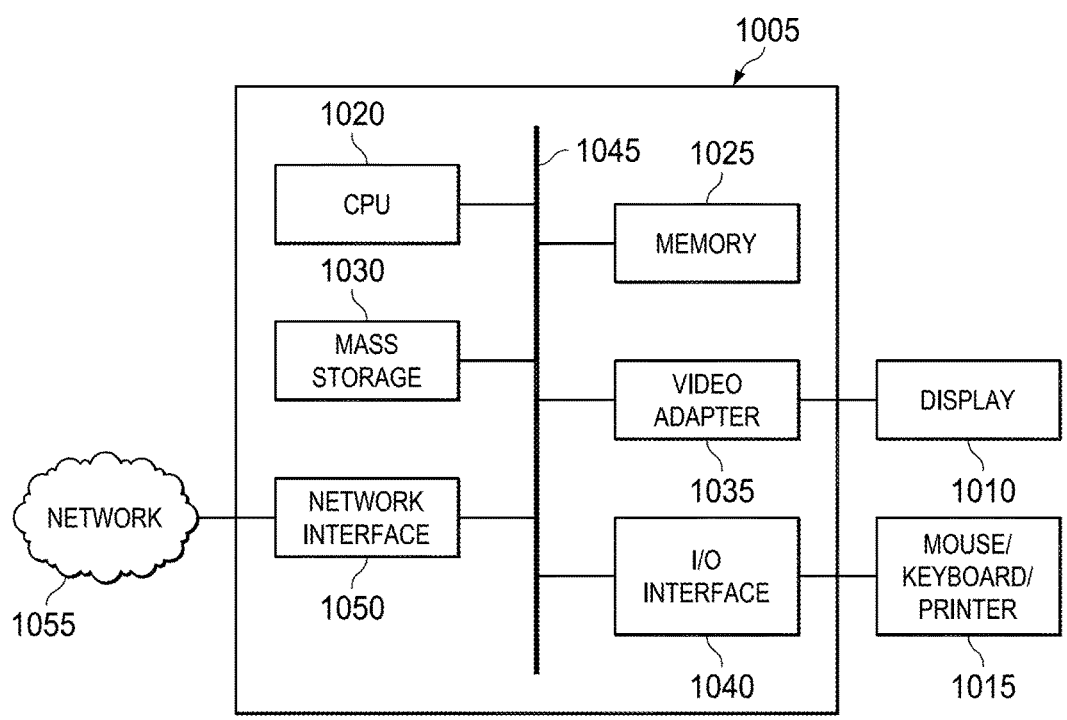
FIG. 10 illustrates a computing platform that may be used for implementing, for example, the devices and methods described herein, in accordance with an embodiment.

FIG. 10 is a block diagram of a processing system 1000 that may be used for implementing the devices and methods disclosed herein. In some embodiments, the processing system 1000 comprises a transmission point or a reception point. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1005 equipped with one or more input/output devices, such as a human interface 1015 (including speaker, microphone, mouse, touchscreen, keypad, keyboard, printer, and the like), display 1010, and so on. The processing unit may include a central processing unit (CPU) 1020, memory 1025, a mass storage device 1030, a video adapter 1035, and an I/O interface 1040 connected to a bus 1045.

The bus 1045 may be one or more of any type of several bus architectures including a memory bus or memory controller, a peripheral bus, video bus, or the like. The CPU 1020 may comprise any type of electronic data processor. The memory 1025 may comprise any type of system memory such as static random access memory (SRAM), dynamic random access memory (DRAM), synchronous DRAM (SDRAM), read-only memory (ROM), a combination thereof, or the like. In an embodiment, the memory 1025 may include ROM for use at boot-up, and DRAM for program and data storage for use while executing programs.

The mass storage device 1030 may comprise any type of storage device configured to store data, programs, and other information and to make the data, programs, and other information accessible via the bus 1045. The mass storage device 1030 may comprise, for example, one or more of a solid state drive, hard disk drive, a magnetic disk drive, an optical disk drive, or the like.

The video adapter 1035 and the I/O interface 1040 provide interfaces to couple external input and output devices to the processing unit 1000. As illustrated, examples of input and output devices include the display 1010 coupled to the video adapter 1035 and the mouse/keyboard/printer 1015 coupled to the I/O interface 1040. Other devices may be coupled to the processing unit 1000, and additional or fewer interface devices may be utilized. For example, a serial interface such as Universal Serial Bus (USB) (not shown) may be used to provide an interface for a printer.

The processing unit 1000 also includes one or more network interfaces 1050, which may comprise wired links, such as an Ethernet cable or the like, and/or wireless links to access nodes or different networks 1055. The network interface 1050 allows the processing unit 1000 to communicate with remote units via the networks 1055. For example, the network interface 1050 may provide wireless communication via one or more transmitters/transmit antennas and one or more receivers/receive antennas. In an embodiment, the processing unit 1000 is coupled to a local-area network or a wide-area network 1055 for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A reception point comprising:
   a non-transitory memory storage comprising instructions; and
   one or more processors in communication with the non-transitory memory storage, wherein the one or more processors execute the instructions to:
   receive a plurality of first beam-formed reference signals spanning a first plane,
   send, to a transmission point, a first feedback indicating at least one first beam-formed reference signal,
   receive a configuration message from the transmission point that indicates a number of beams per a second plane that are supported by the transmission point, and
   receive, according to the number of beams per the second plane that are supported by the transmission point, a plurality of second beam-formed reference signals spanning the second plane and oriented in a direction of the at least one first beam-formed reference signal, the second plane being different than the first plane.

2. The reception point of claim 1, further comprising:
   selecting, by the reception point, the at least one first beam-formed reference signal from the plurality of first beam-formed reference signals in accordance with a first selection criterion;
   selecting, by the reception point, at least one of the second beam-formed reference signals in accordance with a second selection criterion; and
   sending, by the reception point to the transmission point, a second feedback indicating the at least one second beam-formed reference signal.

3. The reception point of claim 2, wherein each of the first selection criterion and the second selection criterion include one of a received signal strength, a signal to noise ratio (SNR), a signal to interference plus noise ratio (SINR), or a channel capacity.

4. The reception point of claim 2, wherein the second feedback includes beam indices corresponding to one or more beam-formed reference signals in the at least one first beam-formed reference signal, the at least one second beam-formed reference signal, or both.

5. The reception point of claim 2, wherein the one or more processors execute the instructions to receive configuration information for beam-formed reference signals in the first and second planes, the configuration information including at least one of a number of beam-formed reference signals in each plane, a number of repetitions of the beam-formed reference signals in each plane, an indicator of a feedback method for the reception point, a downlink transmission capability of a transmission point, or a resource location for the beam-formed reference signals.

6. The reception point of claim 1, wherein the first feedback further indicates a first subset of the at least one first beam-formed reference signal.

7. The reception point of claim 1, wherein the first feedback also comprises one or more channel quality indicators for the at least one first beam-formed reference signal.

8. The reception point of claim 1, wherein the first feedback includes beam indices corresponding to beam-formed reference signals in a first subset of the at least one first beam-formed reference signal.

9. The reception point of claim 1, wherein the first feedback includes at least one of a first precoding matrix indicator for a first subset of the at least one first beam-formed reference signal.

10. The reception point of claim 1, wherein the first second feedback comprises at least one of a channel quality indicator or a rank indicator.

11. The reception point of claim 1, wherein the first plane is an azimuth plane and the second plane is an elevation plane.

12. The reception point of claim 1, wherein the first plane is an elevation plane and the second plane is an azimuth plane.

13. The reception point of claim 1, wherein the one or more processors further execute the instructions to:
    receive configuration information for beam-formed reference signals in the first and second planes, the configuration information including at least one of a number of beam-formed reference signals in each plane, a number of repetitions of the beam-formed reference signals in each plane, an indicator of a feedback method for the reception point, a downlink transmission capability of a transmission point, or a resource location for the beam-formed reference signals.

14. A transmission point comprising:
    a non-transitory memory storage comprising instructions; and
    one or more processors in communication with the non-transitory memory storage, wherein the one or more processors execute the instructions to:
    send a plurality of first beam-formed reference signals to a reception point, the plurality of first beam-formed reference signals spanning a first plane,
    receive, from a reception point, a first feedback indicating at least one first beam-formed reference signal, of the plurality of first beam-formed reference signals spanning the first plane, meeting a first selection criterion and a request to commence operations in a second plane, the second plane being different than the first plane,
    send a configuration message indicating no support for beam-forming in the second plane; and
    receive a second feedback comprising a channel quality indicator for a subset of the at least one first beam-formed reference signal.

15. The transmission point of claim 14, wherein the one or more processors execute the instructions to send configuration information for beam-formed reference signals in the first plane including at least one of a number of beamformed reference signals in each plane, a number of repetitions of the beam-formed reference signals in the first plane, an indication of a feedback method for the reception point, a downlink transmission capability of a transmission point, or a resource location for the beam-formed reference signals.

16. The transmission point of claim 14, wherein the one or more processors execute the instructions to select transmission parameters in accordance with the channel quality indicator, and to send an indication of the transmission parameters to the reception point.

17. The transmission point of claim 16, wherein the indication of the transmission parameters comprises at least one of a modulation and coding scheme (MCS) level, a beam index of a beam-formed reference signal selected in accordance with the channel quality indicator, a precoding matrix indicator (PMI), or a rank indicator (RI).

18. A reception point comprising:
    a non-transitory memory storage comprising instructions; and
    one or more processors in communication with the non-transitory memory storage, wherein the one or more processors execute the instructions to:
        receive a plurality of first beam-formed reference signals from a transmission point, the plurality of first beam-formed reference signals spanning a first plane;
        send, to a transmission point, a first feedback indicating at least one first beam-formed reference signal;
        receive a configuration message indicating no support for beam-forming in a second plane, the second plane being different than the first plane; and
        send, to the transmission point, a second feedback comprising a channel quality indicator for a subset of the at least one first beam-formed reference signal.

19. The reception point of claim 18, wherein the one or more processors further execute the instructions to:
    receive at least one second beam-formed reference signal in accordance with the first feedback;
    measure channel state information for the at least one second beam-formed reference signal; and
    determine the channel quality indicator from the channel state information.

20. The reception point of claim 18, wherein the at least one second beam-formed reference signal and the at least one first beam-formed reference signal are associated with the same beam direction.

* * * * *